United States Patent
James et al.

(10) Patent No.: US 11,256,853 B2
(45) Date of Patent: Feb. 22, 2022

(54) PARAMETERIZING NETWORK COMMUNICATION PATHS

(71) Applicant: Google LLC, Mountain View, CA (US)

(72) Inventors: Gavin James, Los Angeles, CA (US); Justin Lewis, Marina Del Rey, CA (US)

(73) Assignee: GOOGLE LLC, Mountain View, CA (US)

(*) Notice: Subject to any disclaimer, the term of this patent is extended or adjusted under 35 U.S.C. 154(b) by 122 days.

(21) Appl. No.: 16/848,046

(22) Filed: Apr. 14, 2020

(65) Prior Publication Data

US 2020/0241712 A1 Jul. 30, 2020

Related U.S. Application Data

(62) Division of application No. 15/408,861, filed on Jan. 18, 2017, now abandoned.

(51) Int. Cl.
*G06F 16/00* (2019.01)
*G06F 40/143* (2020.01)
(Continued)

(52) U.S. Cl.
CPC .......... *G06F 40/143* (2020.01); *G06F 3/0482* (2013.01); *G06F 16/3334* (2019.01);
(Continued)

(58) Field of Classification Search
CPC .. G06F 40/134; G06F 40/221; G06F 16/9535; G06F 16/3334; G06F 3/0482; H04L 67/22
See application file for complete search history.

(56) References Cited

U.S. PATENT DOCUMENTS 7,660,815 B1  2/2010 Scofield et al.
7,779,147 B1  8/2010 Wang et al.
(Continued)

FOREIGN PATENT DOCUMENTS

WO  WO-2009/012466 A2  1/2009

OTHER PUBLICATIONS

First Office Action for CN Appln. Ser. No. 201780000967.1 dated Apr. 23, 2021 (21 pages).
(Continued)

*Primary Examiner* — Tyler J Torgrimson
(74) *Attorney, Agent, or Firm* — Marshall, Gerstein & Borun LLP

(57) ABSTRACT

Systems and methods of parameterizing network communication paths are provided. The system can identify a network communication path traversed by a plurality of client computing devices via a network protocol. The system can generate, based on a parameter of the network communication path and an attribute of each of a plurality of keywords to the hyperlink on the first web page that directed the plurality of client computing devices to the second web page via the network protocol, a weight data structure with a scalar value for each of the plurality of keywords. The system can select, based on a comparison of the scalar value for each of the plurality of keywords, a keyword of the plurality of keywords to input into an online content selection process to select the content item in response to a request for content received from a client computing device.

20 Claims, 4 Drawing Sheets

(51) Int. Cl.
   *G06F 3/0482*  (2013.01)
   *H04L 67/50*  (2022.01)
   *G06F 16/33*  (2019.01)
   *G06F 16/9535*  (2019.01)
   *G06F 40/134*  (2020.01)
   *G06F 40/221*  (2020.01)

(52) U.S. Cl.
   CPC ........ *G06F 16/9535* (2019.01); *G06F 40/134* (2020.01); *G06F 40/221* (2020.01); *H04L 67/22* (2013.01)

(56) References Cited

U.S. PATENT DOCUMENTS

| | | | |
|---|---|---|---|
| 7,809,801 B1 * | 10/2010 | Wang | G06Q 30/0255 709/217 |
| 7,831,582 B1 | 11/2010 | Scofield et al. | |
| 8,364,529 B1 | 1/2013 | Zwicky et al. | |
| 8,386,509 B1 | 2/2013 | Scofield et al. | |
| 8,572,114 B1 | 10/2013 | Hubinette | |
| 2005/0137939 A1 | 6/2005 | Calabria et al. | |
| 2008/0256034 A1 | 10/2008 | Chang et al. | |
| 2009/0024700 A1 * | 1/2009 | Garg | G06Q 30/02 709/203 |
| 2013/0132366 A1 | 5/2013 | Pieper | |
| 2017/0277693 A1 | 9/2017 | Mehedy et al. | |

OTHER PUBLICATIONS

International Preliminary Report on Patentability, Ch. I, for PCT Appln. Ser. No. PCT/US2017/034267 dated Aug. 1, 2019 (10 pages).

International Search Report and Written Opinion for PCT Appln. Ser. No. PCT/US2017/034267 dated Jul. 12, 2017 (15 pages).

Joshi et al., "Keyword Generation for Search Engine Advertising", Standford University, USA (5 pages).

Lin-Chih, Chen, "Using a two-stage technique to design a keyword suggestion system", Information Research, vol. 15, No. 1, Mar. 2010, Department of Information Management, National Dong Hwa University, Hualien 97401, Taiwan (19 pages).

Non-Final Office Action for U.S. Appl. No. 15/408,861 dated Aug. 29, 2019 (17 pages).

Yifan et al., "Advertising Keyword Suggestion Based on Concept Hierarchy" WSDM '08, Feb. 11-12, 2008, Palo Alto, California, pp. 251-260 (10 pages).

* cited by examiner

PARAMETERIZING NETWORK COMMUNICATION PATHS

CROSS-REFERENCE TO RELATED APPLICATIONS

This application claims the benefit of priority as a divisional of U.S. application Ser. No. 15/408,861, filed Jan. 18, 2017, and titled "PARAMETERIZING NETWORK COMMUNICATION PATHS", the contents of which is incorporated herein by reference in its entirety.

BACKGROUND

Information can be displayed in a graphical environment, web pages or other interfaces by a computing device. The graphical environment or web pages can include text, images, video, or audio information provided by the entities via an application server or web page server for display. Additional content item objects can also be provided by third parties for display on the web pages together with the information provided by the entities. Thus, a person viewing a graphical environment can access the information that is the subject of the web page, as well as selected third party content item objects that may or may not be related to the subject matter of the web page. Due to the large number of available content item objects and the resource intense nature of the electronic graphical environment, it may be challenging to efficiently select and provide content item objects for display in the graphical environment.

SUMMARY

Computing devices, such as servers, can consume significant computing resources performing real-time content selection processes for digital content item objects that are not going to be selected either by the server or by an end user that receives the selected content item object. Servers can consume significant computing resources as content providers perform searches for relevant keywords, or request recommendations for relevant keywords from the server. Additional computing resources can be utilized as content providers scroll down the list of keyword results because each new page view causes the server to perform another search process or remote procedure call ("RPC"). Using a web crawler to identify anchors (e.g., incoming links), and then using an anchors-only technique to backtrack to a linking site can be vulnerable to deceptive or malicious acts. For example, malicious code or automated programs or services can be used to generate fraudulent or deceptive hyperlinks to form a link farm having a group of web sites that hyperlink to every other site in the group. This can leave keyword generation vulnerable to pollution from attempts at search engine optimization like link farming and similar malicious techniques that provide many fraudulent incoming links. The data processing system may expend a considerable amount of resources on detecting link farming. Further, using anchors only can be problematic due to dead or stale links. The data processing system may expend computing resources to identify and determine whether such old links are stale.

Systems and methods of the present solution provide a data processing system that can reduce processor utilization, memory utilization, remote procedure calls, and bandwidth usage by identifying a network communication path traversed by a computing device to identify parameters that triggered or initiated traversal of the network communication path. The data processing system can weight and score keyword recommendations for content providers based on a network communication path data, such as page referral data. The data processing system can determine the total rate of referrals from each anchor page and represent this as a scalar value that can be used to weight keywords derived from that anchor page.

At least one aspect of the present disclosure is directed to a system to parameterize network communication paths. The system can include a data processing system that includes a network path detection component, a parameterization component, and a content selector component executed by at least one processor. The data processing system can identify a network communication path traversed by a plurality of client computing devices via a network protocol. The network communication path can include a first web page and a second web page. The first web page can include a content item with a hyperlink that directs the plurality of client computing devices to the second web page. The data processing system can generate, based on a parameter of the network communication path and an attribute of each of a plurality of keywords to the hyperlink on the first web page that directed the plurality of client computing devices to the second web page via the network protocol, a weight data structure with a scalar value for each of the plurality of keywords. The data processing system can select, based on a comparison of the scalar value for each of the plurality of keywords, a keyword of the plurality of keywords to input into an online content selection process to select the content item in response to a request for content received from a client computing device.

At least one aspect is directed to a method of parameterizing network communication paths. The method can include a data processing system identifying a network communication path traversed by a plurality of client computing devices via a network protocol. The network communication path can include a first web page and a second web page. The first web page can include a content item with a hyperlink that directs the plurality of client computing devices to the second web page. The method can include the data processing system generating, based on a parameter of the network communication path and an attribute of each of a plurality of keywords to the hyperlink on the first web page that directed the plurality of client computing devices to the second web page via the network protocol, a weight data structure with a scalar value for each of the plurality of keywords. The method can include the data processing system selecting, based on a comparison of the scalar value for each of the plurality of keywords, a keyword of the plurality of keywords to input into an online content selection process to select the content item in response to a request for content received from a client computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
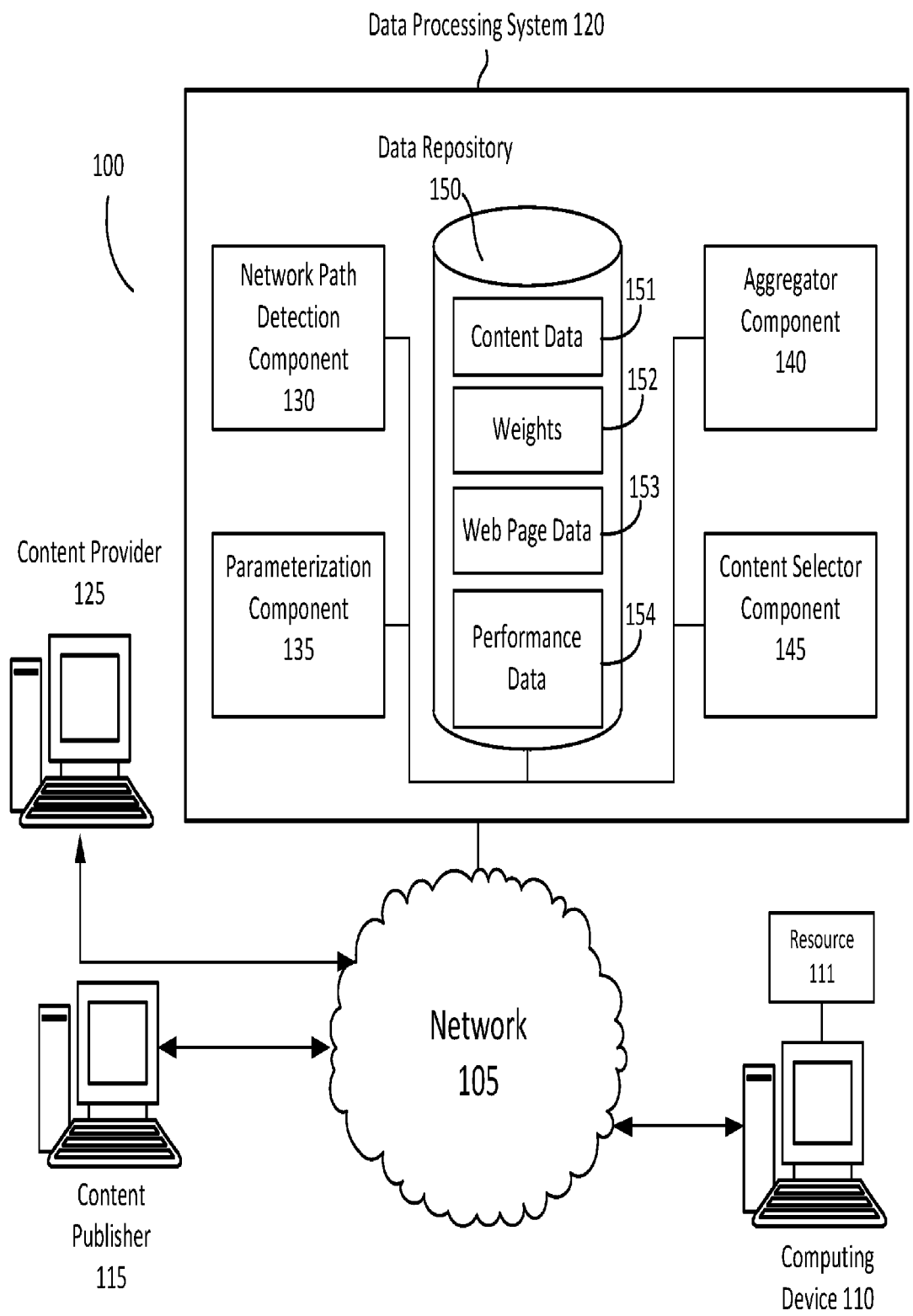
FIG. 1 is an illustration of a system to parameterize network communication paths.

Following below are more detailed descriptions of various concepts related to, and implementations of, methods, apparatuses, and systems of parameterizing network communication paths. The various concepts introduced above and discussed in greater detail below may be implemented in any of numerous ways.

A data processing system including one or more servers or computing devices used to process content item placement campaigns can consume significant computing resources performing real-time content selection processes (e.g., ad auctions) for content items that are not going to be selected either by the data processing system or by the user that receives the selected ad. Data processing systems can consume significant computing resources as content providers perform searches for relevant keywords, or requests recommendations for relevant keywords from the data processing system. Additional computing resources can be utilized as content providers scroll down the list of keyword results because each new page view causes the data processing system to perform another search process or remote procedure call ("RPC"). Using a web crawler to identify anchors (e.g., incoming links), and then using an anchors-only technique to backtrack to a linking site can be vulnerable to deceptive or malicious acts. For example, malicious code or automated programs or services can be used to generate fraudulent or deceptive hyperlinks to form a link farm having a group of web sites that hyperlink to every other site in the group. This can leave keyword generation vulnerable to pollution from attempts at search engine optimization like link farming and similar malicious techniques that provide many fraudulent incoming links. The data processing system may expend a considerable amount of resources on detecting link farming. Further, using anchors only can be problematic due to dead or stale links. The data processing system may expend significant resources to identify and determine whether such old links are stale.

Systems and methods of the present solution provide a data processing system that can reduce processor utilization, memory utilization, remote procedure calls, and bandwidth usage by identifying a network communication path traversed by a computing device to identify parameters that triggered or initiated traversal of the network communication path. The data processing system can weight and score keyword recommendations for content providers based on a network communication path data, such as page referral data. The data processing system can determine the total rate of referrals from each anchor page and represent this as a scalar value that can be used to weight keywords derived from that anchor page.

The data processing system can use clustered data about the set of attributes associated with client devices referred from the anchor page to weight keywords explicitly for that type of client device based on the similar attributes. For example, a client device associated with a first set of attributes (e.g., located in San Jose, Calif. and linked to an end user profile that indicates an interest in science fiction movies) may be more inclined to follow a particular set of keywords to an electronic commerce site as compared to a client device associated with a second set of attributes (e.g., located in New York City, N.Y. and linked to an end user profile that indicates an interest in romance comedies). The data processing system can learn this pattern by combining the attributes of client devices referred with the keywords learned from the referred-by anchor page.

To determine a scalar value that represents the total rate of referrals from each anchor page, and use the scalar value to weight keywords derived from that anchor page, the data processing system can scrape a web anchor page to produce a list of relevant keywords associated with that page. These keywords may be weighted based on attribute associated with the keyword and the one or more hyperlinks to the target page. For example, the attribute can include a proximity, font, size, text color, characteristic, topic, concept, media type (e.g., image, video, text, or audio), or layer. For example, these keywords may be weighted by their proximity to the one or more hyperlinks to the target page. The data processing system can use a browser cookie based mechanism to track client computing devices accessing multiple sites to generate a profile for the client computing device. The browser cookie can include, for example, a pixel, an analytics application programming interface including a set of JavaScript libraries configured to aggregate client computing device session data for third party sites. The browser cookie module can include an authentication mechanism and security components.

The data processing system can use the referrers for the landing web page, as well as similar or related web pages. For example, if a web page is newly constructed and made accessible to client computing devices, the web page may have no traffic. By identifying similar web pages and using referral keyword data from those websites, the data processing system can generate keyword suggestions using this technique for newly constructed web pages.

The data processing system can categorize network activity associated with client computing devices based on the source of where the referral came from. For example, the data processing system can monitor an attribute for a particular web page for each different referrer to that web page because the referrer can provide data about attributes of the client computing devices that accessed the referrer web page. With this, the data processing system can select an attribute or type of network activity associated with client computing devices, and weight the keywords from a referrer by the likelihood that a client computing device from that site will perform the action or network activity. For example, the data processing system can weight referrers by how likely the client computing device is to conduct a network activity associated with a selection of a content item on a web page, interacting with an electronic survey or conducting an electronic transaction.

The data processing system can base the weighting factor on a client computing device selection profile so that the keyword referral sources are weighted based on what percent of referred client computing devices match the content provider's selection criteria. In these examples the content provider can select keywords for an attribute.

The data processing system can combine each of the various weighting implementations by, for example, multiplying the weights together, adding the weights together, averaging the weights, or otherwise combining the weights. The data processing system can determine the weights by counting the number of client computing devices that match or correspond to a condition (e.g., network activity or matched profile) and dividing it by the total number of client computing devices.

In some cases, the data processing system can extract keyword from the anchor pages with referrers and from pages linking to those anchor pages. In this daisy chain fashion, the data processing system can generate weights based on an extended network communication traversed by one or more computing devices.

FIG. 1 illustrates an example system 100 for parameterizing network path communications. The system 100 can include content selection infrastructure. The system 100 can include a data processing system 120 communicating with one or more of a content provider computing device 125, content publisher computing device 115 or client computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. A web browser (e.g., resource 111, application 111 or agent 111) of the computing device 110 can access a web server of the web site operator or content publisher 115 to retrieve a web page for display on a monitor of the computing device 110. The content publisher 115 can provide instructions to the resource 111 executing on the computing device 110 to render the content. The web site operator or content publisher 115 generally includes an entity that operates the web page. The web site operator or content publisher 115 includes at least one web page server that communicates with the network 105 to make the web page available to the computing device 110. The data processing system 120 can provide instructions to the resource 111 executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one computation resource or server. The data processing system 120 can include at least one network path detection component 130, at least one parameterization component 135, at least one aggregator component 140, at least one content selector component 145, and at least one data repository 150. The at least one data repository 150 can include or store, in one or more data structures or data bases, content data 151, weights 152, web page data 153, or performance data 154. Content data 151 can include, for example, content campaign information, content groups, content selection criteria, content item objects or other information provided by a content provider 125 or obtained or determined by the data processing system to facilitate content selection. The network path detection component 120, parameterization component 135, aggregator component 140, and content selector component 145 can each include at least one processing unit or other logic device such as programmable logic array engine, or module configured to communicate with the database repository or database 150. The network path detection component 120, parameterization component 135, aggregator component 140, content selector component 145 and data repository 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

A content provider 125 may establish an electronic content campaign. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. In some cases, an impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser 111, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide one or more keywords and content item objects to each content group. Keywords can include terms that are relevant to the product or services of associated with or identified by the content item objects. A keyword can include one or more terms or phrases. For example, the car dealership may include "sports car," "V-6 engine," "four-wheel drive," "fuel efficiency," as keywords for a content group or content campaign. In some cases, negative keywords can be specified by the content provider to avoid, prevent, block, or disable content placement on certain search result webpages or content webpages matching those negative keywords. The content provider can specify a type of matching, such as exact match, phrase match, or broad match, used to select content item objects.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link.

The data processing system 120 can include, execute, or communicate with a network path detection component 130 to identify a one or more network communication paths traversed by a plurality of client computing devices 110 via a network 105 using a network protocol (e.g., HTTP). A network communication path can refer to a path formed of a first web page that includes a hyperlink that, upon selection, directs or routes a client computing device 110 to a second web page. The hyperlink can be embedded in an electronic content item, such as a supplemental content item or ad. The hyperlink can be embedded or provided alongside an article, image, video, or other multimedia content.

The network path detection component 130 can identify, detect or otherwise determine that the first web page is an anchor web page or a web anchor. The web anchor can refer to a web page that links to a target web page, such as the second web page. The anchor can refer to an incoming link associated with keywords that are to be weighted. A link can refer to a connection from one web resource (e.g., first web page) to another web resource (e.g., second web page). A link can include two ends, such as anchors, and a direction. The link can start at the source or anchor and point to the destination anchor, which can include another web resource such as an image, a video clip, a sound bite, a program, an HTML document, or an element within an HTML document. The link can be activated responsive to network activity, such as a selection, click, mouse over, finger gesture, motion, proximity gesture, or other input activity supported by the user interface (e.g., keyboard input, mouse input, or voice commands) of the computing device 110. Activating the link can direct the computing device 110 to access the second web page, retrieve content of the second web page, render the second web page or otherwise provide or present content of the second web page via the computing device 110. The term referrer can include the action whereby the end user selects the link from the web anchor and is taken to the target web page or second web page.

In some cases, the first page or web anchor can pass a uniform resource locator ("URL") or uniform resource identifier ("URI") of the anchor web page to the second web page or landing web page. For example, the first web page can pass a URI or URL indicating the web address or other identifier of the first web page to the second web page using a referrer parameter. The first web page can pass the URI or URL as text, a string, hypertext, or other format. In some cases, the first web page can encrypt the URL prior to passing the URL. In some cases, the first web page can encapsulate the URL prior to passing the URL. In some cases, the entire URL may be passed, while in other cases the first web page may only pass the domain name. For example, the data processing system 120 can receive the entire URL as follows: www_example1_com/page1.html. In some cases, the data processing system 120 may receive only the domain name as follows: www_example_1_com.

In some cases, the content item on the first web page can include a tracking URL. The tracking URL can include a first portion with a URL to direct the client computing device 110 to the second web page, and a second portion including a token indicating information about the first web page or anchor web page. For example, the first web page can be www_example1_com and the second web page can be www_example2_com. In this example, the tracking URL can be www_example2_com/?token=www_example1_com, where the first portion of the tracking URL includes www_example2_com to direct the client computing device 110 to the second web page, and the second portion includes www_example1_com to indicate information about the first web page.

Since the data processing system 120 may only receive the domain name of the first web page in some cases, the data processing system 120 can receive the entire URI or URL using other techniques. For example, the client computing device 110 can include a resource 111 that executes on the computing device 110 to identify, store and provide information related to the network path communication. For example, the resource 111 can include a cookie agent designed and constructed to identify, detect or otherwise obtain a uniform resource locator of the first web page, and record or store the URL in a data file in memory. The resource 111 can provide the recorded information (e.g., URL or URI) to the data processing system 120 or a content publisher 115 corresponding to the URL.

The first and second web pages can refer to web sites, web pages, resources, applications, multimedia content, video games, mobile applications, desktop applications, widgets, or other digital or electronic content.

The network path detection component 130 can identify multiple web pages or websites traversed by the client computing device 110 prior to accessing the landing web page. In some cases, the network path detection component 130 can identify a daisy chain of web pages, where each web page includes a link to a subsequent web page. A daisy chain can refer to network hop-to-hop-to-hop. The network path detection component 130 can determine the first hop from a javascript tag. The javascript tag can execute on each web page in the daisy chain. The javascript tag can execute on each web page to determine that the same client computing device 110 is accessing each web page (or the same account identifier associated with multiple client computing devices 110). In some cases, the resource 111 on the client computing device 110 can link the multiple web page hops together to create the daisy chain, and transmit the daisy chain sequence to the data processing system 120.

In some cases, the network path detection component 130 can obtain hop information from each of the web pages, and combine the received information to generate the daisy chain or map of web pages traversed by the computing device 110. For example, the client computing device 110 can access a first web page; the first web page can include a first content item with a first tracking URL that directs the client computing device 110 to a second web page; the second web page can include a second content item with a second tracking URL that directs the client computing device 110 to a third web page; the third web page can include a third content item with a third tracking URL that directs the client computing device 110 to a fourth web page. The network path detection component 130 can receive information from each of the second web page, third web page and fourth web page. The information can include, for example, an identifier of the client computing device 110, an indication of the anchor web page, and an indication of the linked web page. For example, the data processing system 120 can receive, from the second web page, information about the first web page that directed the device 110 to the second web page; the data processing system 120 can receive, from the third web page, information about the second web page that directed the device 110 to the third web page; and the data processing system can receive, from the fourth web page, information about the third web page that directed the device 110 to the fourth web page. The network path detection component 130 can compile this information to determine the network communication path traversed by the device 110.

In some cases, a subsequent web page can provide information about multiple previous web pages. For example, the tracking URL of the third web page can provide information identifying the second web page that directed the device 110 to the third web page as well as information identifying the first web page that directed the device 110 to the second web page. For example, the tracking URL can be generated by a script, such as a javascript or other technique, that can append one or more URL identifiers to generate the token. Thus, the second web page can generate the token identifying the first web page, and pass the first web page information to the third web page. The third web page can generate the tracking URL with a token including information about the second web page and the first web page.

The data processing system 120 can include, execute, or communicate with a parameterization component 135 to generate a weight data structure with a scalar value for each of a plurality of keywords. The parameterization component 135 can generate the scalar value based on a parameter of the network communication path and a proximity (or other attribute) of each of the plurality of keywords to the hyperlink on the first web page that directed the plurality of client computing devices to the second web page via the network protocol.

The data processing system 120 or parameterization component 135 can include a web crawler component configured to scrape the web pages to identify keywords, and store the keywords in a data repository. A web crawler (or web spider or web robot) can include a program or automated script that browses the World Wide Web in a methodical, automated manner. This process can be referred to as Web crawling or spidering.

The data processing system 120 can scrape the web page or perform data scraping to extract data from the web page. The data processing system 120 can access the World Wide Web directly using the Hypertext Transfer Protocol, or through a web browser. The data processing system 120 can gather or obtain data from the web page and store the obtained data (e.g., keywords) in data repository 150 for later retrieval or processing.

The data processing system 120 can scrape web pages by fetching the web page and extracting data from the web page. Fetching can refer to downloading of a web page. Therefore, web crawling can be a component of web scraping, such as to fetch pages for later processing. Once fetched, then extraction can take place. The data processing system can parse, search, reformat the content of the web page. The data processing system 120 (e.g., web scraper) can include an API to extract data from the web page.

The data processing system 120 can scrape the web page to identify keywords of the web page (e.g., anchor web page). The data processing system 120 can weight the keywords on the anchor web pages that linked to the landing web page. The data processing system 120 can weight or score the keywords using one or more techniques, and rank the keywords to provide keyword suggestions to the content provider device 125. For example, the data processing system 120 can determine a total rate of referrals from each anchor page to generate a scalar value that can be used to weight keywords derived from that anchor page. The data processing system 120 can further use clustered data about the set of client devices 120 referred form the anchor page to weight keyword based on the type of client computing device 120 (or attribute associated with the client computing device 110).

The data processing system 120 can weight the keywords on the anchor web page (e.g., first web page) based on an attribute of the one or more keywords to the content item including the link to the landing web page (e.g., second web page). The attribute can include, for example, a proximity, font, size, text color, characteristic, topic, concept, media type (e.g., image, video, text, or audio), or layer. The data processing system 120 can weight the keywords based on network activity associated with the landing web page (e.g., whether the client computing device performed an electronic transaction on the landing web page after being referred to the landing web page from the first web page). The data processing system 120 can weight the keywords based on the number computing devices 110 the anchor web page referred to the landing web page. The data processing system 120 can weight the keywords based on a combination of the proximity, number of referrals, and network activity on the landing web page. The data processing system 120 can weight the keywords based on a combination of two or more of the proximity, number of referrals, and network activity on the landing web page. For example, the data processing system 120 can weight the keywords based on a combination of the proximity and the network activity on the landing web page.

The data processing system 120 can weight the keywords based on the proximity (or attribute) of the keyword to the content item. The data processing system 120 can determine a distance between the keyword and the content item. For example, the data processing system can render code of the first web page to determine a layout of the first web page and a location of the keyword relative to the content item object. In some cases, the data processing system 120 can render the code in a virtual environment as opposed to rendering the code for display on a physical display. For example, the data processing system 120 can establish a virtual memory or virtual graphics display on which to render the code of the web page to perform further processing. In some cases, the data processing system 120 can simulate a display of the rendered web page. The data processing system 120 can simulate the display of the web page based on characteristics of a computing device 110 or display device communicatively coupled to the computing device 110. Characteristics can include, for example, screen size, number of pixels, or available content types (e.g., text only, images, video, or multimedia). In some cases, the data processing system 120 can use a standard set of characteristics such that the distances determined for all content items are standard relative to one another. The data processing system 120 can determine the distance between each of the plurality of keywords of the first web page and the content item object that includes the link to the second web page. The data processing system 120 can normalize the distance value. For example, the data processing system 120 can normalize the distances based on a minimum distance and a maximum distance (e.g., normalized_distance_value=(determined_distance_value—minimum_distance_value)/(maximum_distance_value—minimum_distance_value)). The distance value can be normalized for a specific anchor web page, or across a plurality of anchor web pages.

The data processing system 120 can determine the distance between the keyword and the content item based on a number of characters between the keyword and the content item. For example, the keyword can be separated from the content item by a distance of 10 characters, 20 characters, 30 characters, 50 characters or more. The characters can include alphanumeric characters or symbols. In some cases, the characters may not include blank spaces. For example, a blank space may not be used to determine a distance because it may not affect the weight of the keyword. In some cases, the data processing system 120 can count the blank space as a character when determining the distance. In some cases, the data processing system 120 may or may not include multimedia content as a character.

The data processing system 120 can determine a distance between the keyword and the content item based on a number of pixels between the keyword and the content item. The data processing system 120 can render or simulate the web page and calculate the number of pixels separating the keyword (or a portion of the keyword) from the content item with the link (or a portion of the content item). The data processing system 120 can use a default display size or display resolution to determine the distance based on number of pixels. The data processing system 120 can retrieve the default pixel size from data repository 150. Default pixel sizes for a mobile device can include, for example, 1080×1920; 750×1334; 640×1136; 1536×2048; 1440×2560; or 1440×2560. Default pixel sizes for a desktop or laptop computing device can include, for example, 1366×768 or 1920×1080.

The data processing system can determine the distance as a bucketized distance. The bucketized distance can refer to a categorization of a distance or indication of distance between the keyword and the content item. The data processing system 120 can form or determine the bucketized distance using one or more buckets as follows: 1) the keyword and the content item are within a threshold number of words; 2) the keyword and the content item are not within the threshold number of words but are within a same sentence; 3) the keyword and the content item are not within the threshold number of words or the same sentence, but are within a same paragraph; 4) the keyword and the content item are not within a threshold number of words, not within the same sentence, not within the same paragraph, but are within a same fold of the web page. The fold of the web page can refer to above-the-fold or below-the-fold. Above-the-fold refers to the area of the web page that is on display on the display screen when the web page is initially rendered for display. Below-the-fold refers to an area of the web page that is not on display when the web page is initially rendered for display, but is displayed when the web page is scrolled down to reveal the area of the web page below-the-fold.

The data processing system 120 can determine a scalar value for a keyword based on how close the keyword is to the content item. A keyword that is closer to the content item can be weighted more heavily or have a higher scalar value, as compared to a keyword that is further away from the content item. For example, if the distance between a first keyword on the first web page and the content item is D1, and the distance between a second keyword on the web page and the content item is D2, and D2 is greater than D1, then the data processing system 120 can weight the first keyword higher than the second keyword. The data processing system 120 can determine a scalar value to include a value within a range of 0 to 1, 0 to 10, 0 to 100, 0 to 1000 or some other range.

The data processing system 120 can weight the keywords based on network activity on the landing page when the client computing device 110 is referred by the first web page. For example, keywords associated with the first web page that directed the client computing device 110 to the second web page where the client computing device 110 engaged in an electronic transaction (e.g., conversion) can be weighted higher than keywords associated with a third web page that directed the client computing device 110 to the second web page without resulting in a conversion.

The data processing system 120 can weight keywords based on a parameter such as the number of referrals made by the web page on which the keyword is present. For example, the parameter can include a total number of instances of the first web page directing the plurality of client computing devices to the second web page during a time interval (e.g., 1 hour, 2 hours, 3 hours, 4 hours, 6 hours, 12 hours, 24 hours, 48 hours, 72 hours, 1 week, 30 days, or 60 days). The data processing system 120 can weight the keywords based on a parameter that includes a ratio of referrals made by the first web page to the landing page and the total number of referrals to the landing page by a plurality of anchor web pages. The parameter can include a total number of instances of the first web page directing the plurality of client computing devices to the second web page divided by a total number of instances of a plurality of web pages directing a second plurality of client computing devices to the second web page during the time interval.

For example, if the first web page referred N number of client computing devices 110 to the landing page, and the second web page referred N+20 number of client computing devices 110 to the landing web page, then keywords on the second web page can be weighted more heavily than keywords on the first web page. If N=100, then, in this example, the parameter for the first page can be 100 and the parameter for the second web page can be 120. The parameter can be normalized based on a range, such as 0 to 1 or 0 to 100. For example, the parameter for the first web page can be normalized to 0 and the parameter for the second web page can be normalized to 1. Similarly, a parameter based on the ratio of referrers can be used to determine weights as follows: first web page referred 100 client computing devices and second web page referred 120 client computing devices, then the weight applied to keywords of the first web page can be 100/(100+120)=0.45 and the weight applied to keywords of the second web page can be 120/(100+120)=0.54.

The data processing system 120 can combine one or more factors to generate the scalar value for the weight. For example, the data processing system 120 can add values associated with the various weighting techniques as follows: first_keyword_weight=proximity_weight+network_activity_weight+number_of_referrals_weight. In another example, the data processing system 120 can apply a greater weight to one or more of the factors as follows: first_keyword_weight=0.5*proximity_weight+3*network_activity_weight+2*number_of_referrals_weight. The data processing system 120 can combine the weights using a sum, multiplication, dot product, or other technique to determine the scalar value that is the weight of the keyword. Thus, the data processing system 120 can determine the scalar value for each keyword on the anchor web page based on one or more factors such as the distance, number of referrals, and network activity on the landing page to weight the keyword.

The data processing system 120 can then rank the keywords based on their weights to select or suggest one or more keywords to add to a content item campaign of a content provider. The content selector component 145 can then use the added keyword to select the content item for display on an end user computing device 110 in response to a request for content. The data processing system can select, based on a comparison of the scalar value for each of the plurality of keywords, a keyword of the plurality of keywords to input into an online content selection process (e.g., executed by the content selector component 145) to select the content item in response to a request for content received from a client computing device 110.

In some cases, the data processing system 120 can select keywords or weights for keywords based on attributes associated with the computing devices 110 that access the anchor web page and the landing web page. Attributes can include, for example, type of computing device (e.g., mobile device, smartphone, desktop, tablet, notepad, wearable device, or smartwatch), geographic location, or other profile information. When selecting content responsive to a request for a computing device 110, the data processing system 120 can select a keyword having the highest weight as determined using historical network path communication information of other computing devices 110 having the same or similar attribute. For example, the data processing system 120 can determine a weight for a first keyword to be 10 and a second keyword to be 20 for computing devices 110 located in San Jose. However, the data processing system 120 can determine the weight for the first keyword to be 20 and the second keyword to be 10 for computing devices 110 located in Boston. Thus, if the data processing system 120 receives a request for content from a computing device 110 located in Boston, the data processing system 120 can use the first keyword with the weight of 20 as input into the real-time content selection process to select a content item object to provide for display via the computing device 110.

The data processing system 120 can include, execute, or otherwise communicate with a content selector component 118 to receive and select, based on the keyword, a content item via a real-time content selection process. The content selection process can refer to, or include, selecting sponsored content item objects provided by third party content providers 125. The real-time content selection process can include a service in which content items provided by multiple content providers are parsed, processed, weighted, or matched in order to select one or more content items to provide to the computing device 110. The content selector component 145 can perform the content selection process in real-time. Performing the content selection process in real-time can refer to performing the content selection process responsive to the request for content received via the client computing device 110. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 110, or within a time interval after the communication session is terminated.

For example, the data processing system 120 can include a content selector component 145 designed, constructed, configured or operational to select content item objects. To select content items for display, the data processing system 120 can use keywords to select a matching content item based on a broad match, exact match, or phrase match. For example, the content selector component 145 can analyze, parse, or otherwise process subject matter of candidate content items to determine whether the subject matter of the candidate content items correspond to the subject matter of the keywords or phrases associated with the request for content from the computing device 110 (e.g., keywords associated with main content of a web page or a search query input into a search engine). The content selector component 145 can identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 145 may process the metadata to determine whether the subject matter of the candidate content item corresponds to the input keywords.

The data processing system 120 can include, execute or otherwise access an aggregator component 140 to aggregate anchor web pages. For example, the network communication path can include a plurality of network communication paths formed of a plurality of different anchor web pages that direct a plurality of client computing devices 110 to the same landing web page. The aggregator can combine data among the plurality of anchor web pages and client devices to block the content provider or other administrator or user of system 100 from identifying an anchor web page or client computing device.

In some cases, the aggregator component 140 can determine an attribute (e.g., a second attribute) associated with a cluster formed of at least two of the plurality of client computing devices. For example, the aggregator component 140 can identify an attribute such as type of computing device or location, and form a cluster of computing devices that share the same or similar attributes. The data processing system 120 can then select the keyword of the plurality of keywords to input into the online content selection process to select the content item in response to the request for content received from a client computing device matching the attribute associated with the cluster.

In some cases, the data processing system 120 can generate keyword suggestions for a landing web page for which the data processing system 120 may not have access to historical performance information. For example, the data processing system 120 can determine that a first landing page for which the data processing system 120 has network communication path information is similar to a second, new landing web page, and select keywords for the second landing web page based on network communication path information of the first landing web page. The data processing system 120 can determine that the first and second landing web pages are similar based on the same content provider providing the two landing pages, based on a similarity of meta data associated with the two landing pages, based on a semantic analysis of the two landing pages, or an instruction regarding similarity received from a content provider 125 of the two landing pages. Thus, the data processing system 120 can use the first landing web page as a proxy for the second, new landing web page with respect to generating keyword suggestions for the second, new landing web page.

Thus, the data processing system 120 can reduce processor utilization, memory utilization, remote procedure calls, and bandwidth usage by identifying a network communication path traversed by a computing device to identify parameters that triggered or initiated traversal of the network communication path. The data processing system can weight and score keyword recommendations for content providers based on a network communication path data, such as page referral data. The data processing system can determine the total rate of referrals from each anchor page and represent this as a scalar value that can be used to weight keywords derived from that anchor page. By selecting the keyword using this technique, the data processing system can facilitate set up and processing of the content item placement campaign, thereby reducing additional remote procedure calls or search queries.

Figure 2:
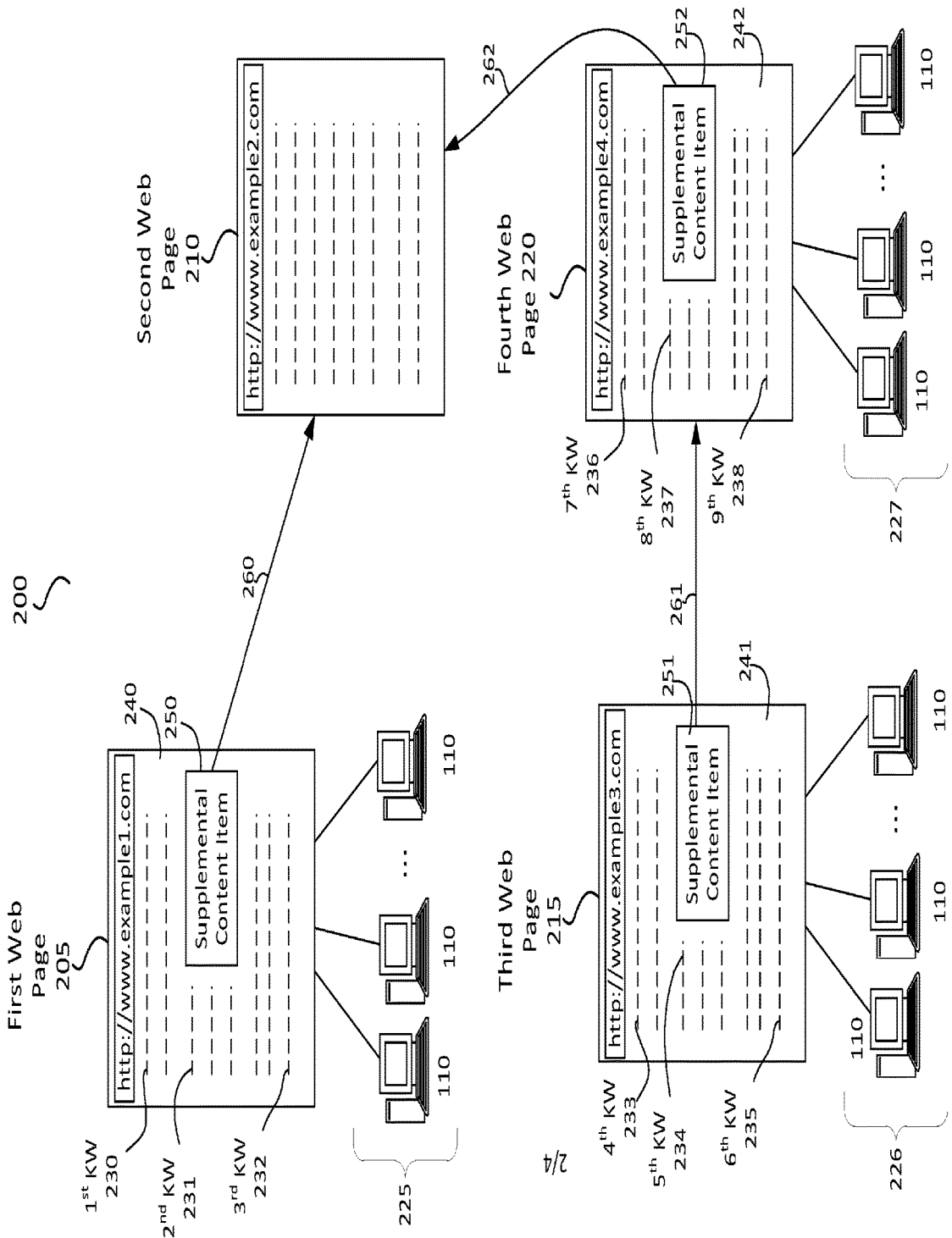
FIG. 2 is an illustration of an operational system flow to parameterize network communication paths.

FIG. 2 is an illustration of an operational system flow to parameterize network communication paths. The system 200 can include or be performed by system 100, system 400, or one or more component thereof. The system can include three sets of client computing devices 110 as follows: first set of client computing devices (225), second set of client computing devices (226) and a third set of client computing devices (227). The first, second and third set of client computing devices 225-227 can access web pages. For example, the first set of client computing devices 225 can access a first web page 205; the second set of client computing devices 226 can access a third web page 215; and the third set of client computing devices 227 can access a fourth web page 220. Each of the first, second, and third web pages 205, 215 and 220 can include respective main content 240, 241 and 242, and respective supplemental content 250, 251 and 252. The supplemental content can include a content item object provided by a content provider 125 and selected by a content selector component 145 during a real-time content selection process.

The first web page 205 can include main content 240 that includes a first keyword 230, a second keyword 231 and a third keyword 232. The first web page 205 can include supplemental content item 250 that links to the second web page 210. The first web page 205 can be referred to as an anchor web page and the second web page 210 can be referred to as a landing web page. The network communication path 260 can be formed of the first web page 205 linking to the second web page 210.

The third web page 215 can include main content 241 that includes a fourth keyword 233, a fifth keyword 234 and a sixth keyword 235. The third web page 215 can include supplemental content item 251 that links to the fourth web page 220. The third web page 215 can be referred to as a first anchor web page and the fourth web page 220 can be referred to as a second anchor web page. The fourth web page 220 can include main content 242 that includes a seventh keyword 236, an eighth keyword 237 and a ninth keyword 238. The fourth web page 220 can include supplemental content item 252 that links to the second web page 210. The fourth web page 220 can be referred to as an anchor web page and the second web page 210 can be referred to as a landing web page. In some cases, the third web page 215 and the fourth web page 220 can be daisy chained together to form network communication path having two portions 261 and 262. The first portion of the network communication path 261 can include the link from the third web page 261 to the fourth web page 220; and the second portion of the network communication path 262 can include the link from the fourth web page 220 to the second web page 210. In some cases, the second set of computing devices 226 can at least partially overlap with the third set of computing devices 227 because a same computing device can access the third web page 215; interact with supplemental content item 251; be directed to the fourth web page 220 responsive to interaction with supplemental content item 251; interact with supplemental content item 252; and be directed to landing web page 210 responsive to interaction with supplemental content item 252.

The data processing system 120 can weight or score keywords (e.g., 230-238) based on one or more of the proximity of a keyword to the supplemental content item 250, the number of referrals from the anchor web page (e.g., 205, 215 or 220) including the keyword to the landing web page 210, and network activity that occurs on the landing web page 210. For example, the total referrer visits to the second web page 210 during a 24 hour time interval can be 30. Twenty of the thirty visits can be from the first web page 205; and ten of the thirty visits can be from the third web page 215 via the fourth web page 220. Of the twenty visits from the first web page 205, 50% can result in a conversion network activity; and of the 10 visits from the third web page 215, 20% can result in a conversion network activity. The data processing system 120 can use this information in conjunction with a distance between a keyword on the respective web page and the content item to determine a weight, score, or other value for the keyword, and select one or more of the keywords to input into a content item selection process.

For example, the data processing system 120 can determine, for the first web page 205, that the distance between the third keyword 232 and the supplemental content item 250 is greater than the distance between the first keyword 230 and the supplemental content item 250, which is greater than the distance between the second keyword 231 and the supplemental content item 250. Accordingly, since the second keyword 231 has the shortest distance to the supplemental content 250, the second keyword 231 can receive the highest weight based on distance for the first web page 205.

The data processing system 120 can determine a distance based weight for the keywords of the third web page 215 and the fourth web page 220. For example, the data processing system 120 can determine, for the third web page 215, that the distance between the sixth keyword 235 and the supplemental content item 251 is greater than the distance between the fourth keyword 233 and the supplemental content item 251, which is greater than the distance between the fifth keyword 234 and the supplemental content item 251. Accordingly, since the fifth keyword 234 has the shortest distance to the supplemental content 251, the fifth keyword 234 can receive the highest weight based on distance for the third web page 215.

The data processing system 120 can determine, for the fourth web page 220, that the distance between the ninth keyword 238 and the supplemental content item 252 is greater than the distance between the seventh keyword 236 and the supplemental content item 252, which is greater than the distance between the eighth keyword 237 and the supplemental content item 252. Accordingly, since the eighth keyword 237 has the shortest distance to the supplemental content 252, the eighth keyword 237 can receive the highest weight based on distance for the fourth web page 220.

Furthermore, the data processing system 120 can compare the distance based weight of keywords across multiple web pages. For example, the data processing system 120 can determine a normalized distance for the keywords that can be compared across multiple web pages. In this example, the data processing system 120 can determine that the distance (e.g., normalized distance) between the second keyword 231 and supplemental content item 250 is greater than the distance (e.g., normalized distance) between the eighth keyword 237 and the supplemental content item 252, which is greater than the distance (e.g., normalized distance) between the fifth keyword 234 and the supplemental content item 251. Accordingly, since the fifth keyword 234 has the shortest distance to the supplemental content 251, as compared to the second keyword 231 and the eighth keyword 237, the data processing system 120 can assign the fifth keyword 234 the highest weight based on distance relative to the keywords of the first web page 205, the third web page 215 and the fourth web page 220.

The data processing system 120 can combine the distance based weights with weights generated based on number of referrals from the web page or corresponding network activity on the landing page. The data processing system 120 can weight one or more web pages in a daisy chain (e.g., third web page 215) based on the resulting network activity on the landing web page 210. The data processing system 120 can apply a weight to keywords of the third web page 215 that is determined based on the number of referrals from the web page 215 that resulted in a referral from web page 220 to the landing page 210. The weight applied to keywords of the third web page 215 can be based on a total number of referrals that resulted in a referral to the landing page, or a ratio, during the time interval. The ratio can be a ratio of referrals from the third web page 215 that resulted in a referral to the landing web page 210 divided by a total number of referrals from the fourth web page 220 to the second web page 210 during the time interval. The ratio can be a ratio of referrals from the third web page 215 that resulted in a referral to the landing web page 210 divided by a total number of referrals from the first web page 205 and the fourth web page 220 to the second web page 210 during the time interval. The ratio can be a ratio of referrals from the third web page 215 that resulted in a referral to the landing web page 210 divided by a total number of visits to the second web page 210 during the time interval.

Figure 3:
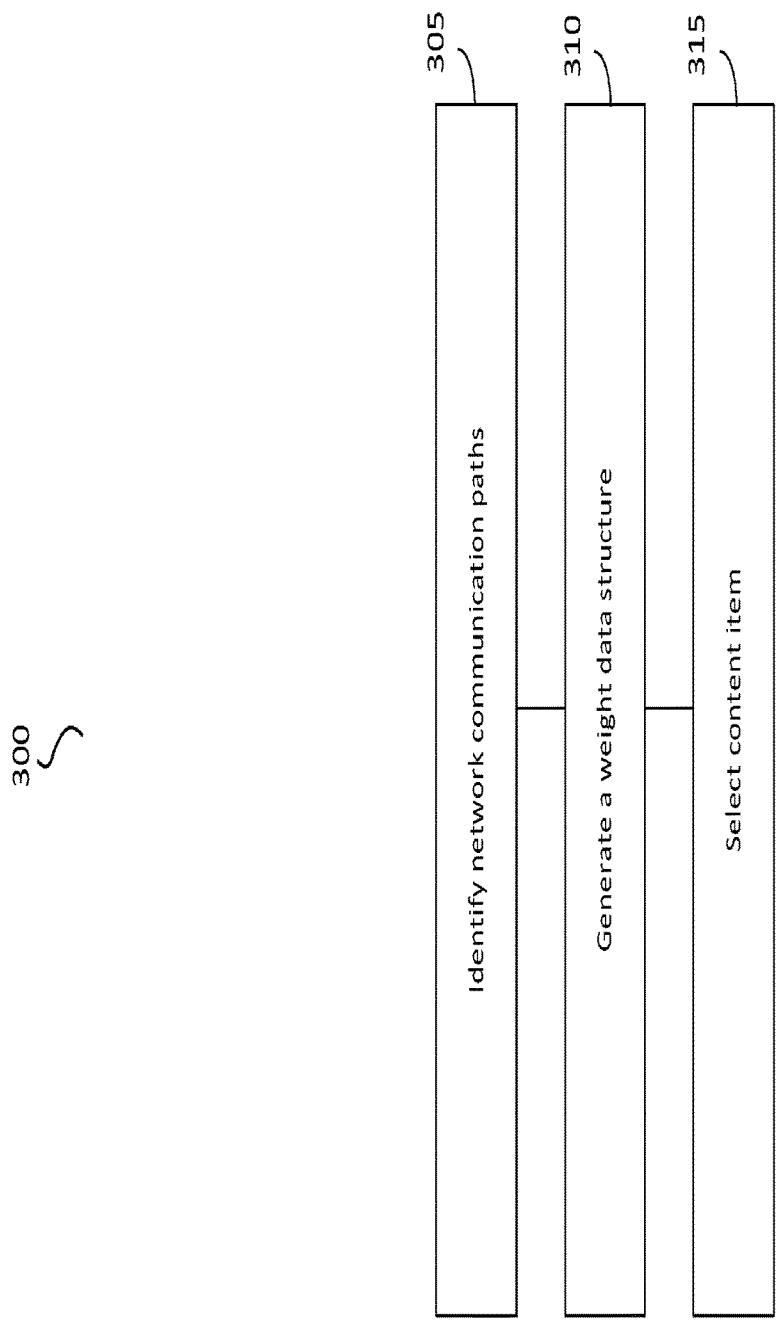
FIG. 3 is an illustration of a method of parameterizing network communication paths.

FIG. 3 is an illustration of a method of parameterizing network communication paths. The method can include a computer-implemented method (or data processing system)

of parameterizing network communication paths comprising at least one processor in communication with at least one memory. The method 300 can be performed via one or more system or component illustrated in FIG. 1, FIG. 2, or FIG. 4, including, e.g., a data processing system, network path detection component, parameterization component, content selector component, data repository, content provider, content publisher, network, computing device, or agent.

At ACT 305, a data processing system can identify a network communication path. The data processing system can identify one or more network communication paths traversed by a one or more client computing devices via a network protocol. The network communication paths can including a first web page and a second web page. The first web page can include a content item with a hyperlink that directs the one or more client computing devices to the second web page. In some cases, the e first web page can include an anchor web page, and the second web page can include a landing web page provided by a content provider device.

At ACT 310, the data processing system can generate a weight data structure. Generating the weight data structure can include or refer to updating, manipulating, modifying, or otherwise accessing a previously generating weight data structure. The weight data structure can include scalar values for keywords that were present on a web page. The data processing system can obtain the keywords by scraping the web page to identify the keywords. The data processing system can store the identified keywords in a data repository.

The data processing system can generate the weights based on a parameter of the network communication path and a proximity of each of a plurality of keywords to the hyperlink on the first web page that directed the plurality of client computing devices to the second web page via the network protocol. The parameter can include, for example, a number of referrals to the landing page via the network communication path; or a ratio based on the number of referrals to the landing page via the network communication path and the total number of referrals to the landing page via all network communication paths including an anchor web page; or a ratio based on the number of referrals to the landing page via the network communication path and the total number of visits to the landing page during a time interval.

The weight data structure can include a value for each of a plurality of keywords. The weight can be specific to the keyword and the landing web page. The weight can be specific to the keyword and the content item. For example, the keyword can appear on multiple anchor web pages that display a same content item that leads to a same landing web page. In this example, the weight of the keyword can be determined for each of the anchor web pages and combined to generate an overall weight for the keyword when used to select any content item that leads to the same landing web page. In some cases, the weight of the keyword can be determined for each of the anchor web pages and combined to generate an overall weight for the keyword when used to select the same content item that leads to the same landing web page.

At ACT 315, the data processing system can select a content item. The data processing system can select the content item based on the keyword. The keyword can be selected by the data processing system based on a comparison of the scalar value for each of the plurality of keywords. The keyword with the highest scalar value in the weight data structure can be suggested to a content provider for inclusion in a content campaign; or the data processing system can automatically add the keyword to the content campaign. The data processing system can input the selected keyword into an online content selection process to select the content item in response to a request for content received from a client computing device.

Figure 4:
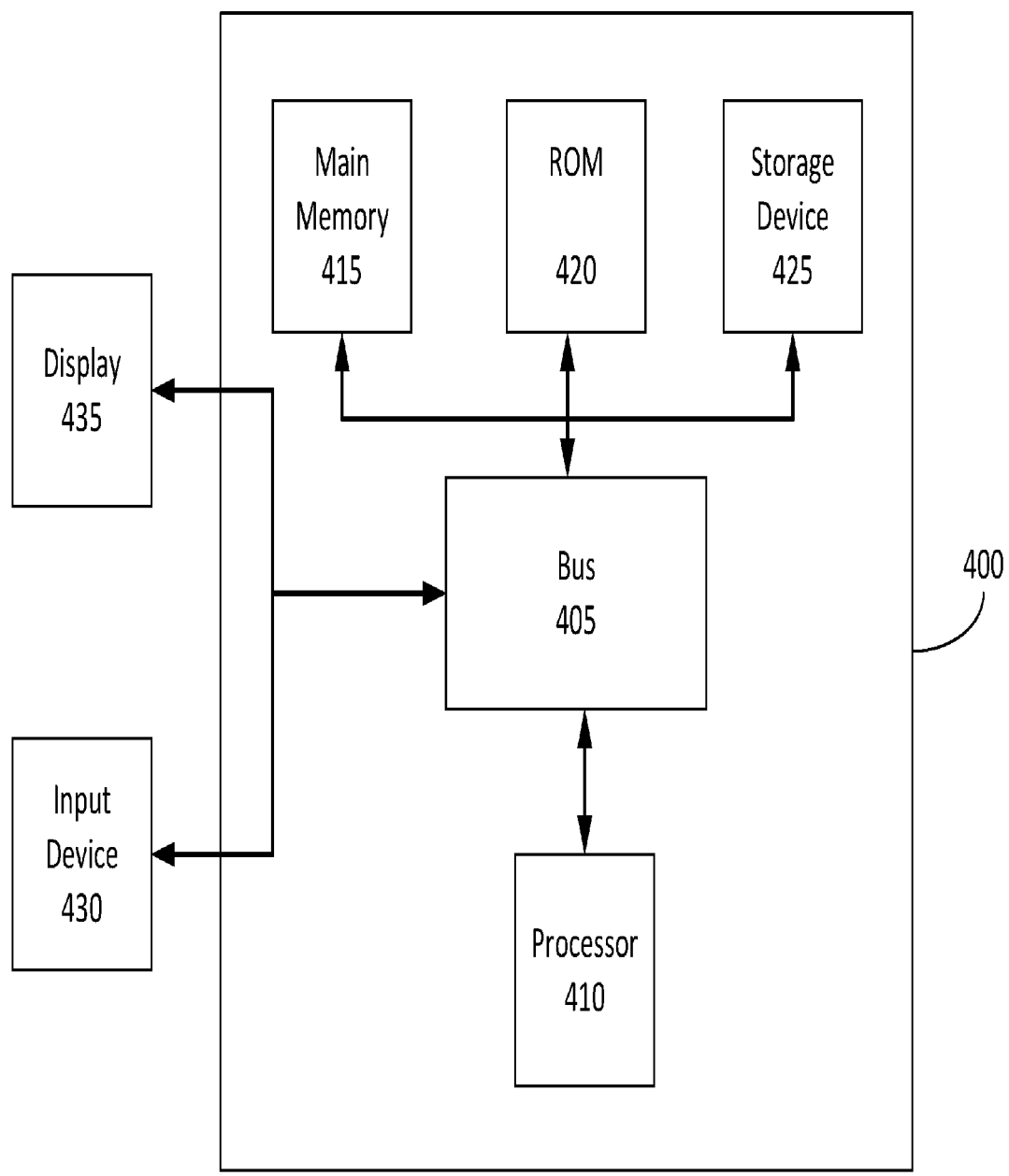
FIG. 4 is a block diagram illustrating an architecture for a computer system that may be employed to implement various elements of the systems shown in FIGS. 1 and 2, and the method shown in FIG. 3.

FIG. 4 is a block diagram of an example computer system 400. The computer system or computing device 400 can include or be used to implement the system 100, or its components such as the data processing system 120. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 120, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The network path detection component 120, parameterization component 135, aggregator component 140, content selector component 145 and other data processing system 120 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 120) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. A server can transmit data (e.g., data packets representing a content item)

to a client device (e.g., for purposes of displaying data to and receiving user input from a user interacting with the client device). Data generated at the client device (e.g., a result of the user interaction) can be received from the client device at the server (e.g., received by the data processing system 120 from the computing device 110 or the content provider computing device 125 or the content publisher device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the network path detection component 130 or the content selector component 145, can be a single component, app, or program, or a logic device having one or more processing circuits, or part of one or more servers of the data processing system 120.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for content selection, comprising:
   a server device comprising a processor, and a memory element storing a database;
   wherein the processor is configured to:
      provide a destination webpage to a first client device of a plurality of client devices responsive to a first request from the first client device, the first request identifying a first source webpage as a referrer, the first source webpage comprising a link to the destination webpage;
      identify a set of keywords of the first source webpage;
      for each keyword of the set of keywords:
         calculate a proximity of the keyword to the link to the destination webpage on the first source webpage,
         identify a network activity value based on the value of an interaction with the keyword on the first source webpage,
         determine a ratio between a historical number of requests from the plurality of client devices for the destination webpage responsive to interactions with the link on the first source webpage, and a historical number of requests from the plurality of client devices for the destination webpage responsive to interactions with a third link on a third source webpage, and
         calculate a score for the respective keyword based on the calculated proximity, the network activity value, and the determined ratio;
      rank each keyword of the set of keywords based on the score for the respective keyword;
      select a content item based on a highest ranked keyword in the set of keywords; and
      provide the selected content item to a client device requesting the destination webpage.

2. The system of claim 1, wherein the first source web page comprises an anchor web page, and the destination web page comprises a landing web page provided by a content provider device.

3. The system of claim 1, wherein the processor is further configured to scrape the first source web page to identify the set of keywords, and store the set of keywords in the database.

4. The system of claim 1, wherein the processor is further configured to:
render code of the first source web page;
determine a distance between each of the set of keywords of the first source web page and a second content item comprising the link to the destination webpage; and
calculate the score for each of the set of keywords further based on the distance between each keyword of the set of keywords of the first source web page and the second content item.

5. The system of claim 4, wherein the processor is further configured to:
determine the distance between a first keyword of the set of keywords of the first source web page and the second content item based on a number of characters between the first keyword and the second content item; and
calculate the score for first keyword further based on the distance between the first keyword and the second content item.

6. The system of claim 4, wherein the processor is further configured to:
determine the distance between a first keyword of the set of keywords of the first source web page and the second content item based on a number of pixels between the first keyword and the second content item; and
calculate the score for the first keyword further based on the distance between the first keyword and the second content item.

7. The system of claim 4, wherein the processor is further configured to:
determine a bucketized distance between a first keyword of the set of keywords of the first source web page and the second content item, the bucketized distance corresponding to at least one of:
within a threshold number of words,
within a same sentence,
within a same paragraph, or
within a same fold of the first web page; and
calculate the score for the first keyword based on the bucketized distance between the first keyword and the second content item.

8. The system of claim 1, wherein the processor is further configured to:
identify a second network communication path traversed by a second plurality of client devices via the network protocol, the second network communication path including a third web page and the first source web page, the third web page comprising a link pointing to the first source web page; and
calculate, based on a second parameter of the second network communication path and a proximity of each of a third set of keywords to the link of the third web page that points to the first source web page via the network protocol, a third score for each of the third set of keywords.

9. The system of claim 1, wherein the processor is further configured to:
provide the destination webpage to the first client device responsive to a second request from the first client device, the second request identifying a second source webpage as a referrer, the second source webpage comprising a second link to the destination webpage;
identify a second set of keywords of the second source webpage;
for each second keyword of the second set of keywords:
calculate a second proximity of the second keyword to the second link to the destination webpage on the second source webpage,
identify a second network activity value based on the value of a second interaction with the second keyword on the second source webpage,
determine a second ratio between a second historical number of requests from client devices for the destination webpage responsive to interactions with the second link on the second source webpage, and a second historical number of requests from client devices for the destination webpage responsive to interactions with a fourth link on a fourth source webpage, and
calculate a respective second score for the second keyword, based on the calculated second proximity, the second network activity value, and the second determined ratio;
rank each second keyword in the second set of keywords based on the respective second score;
select a second content item based on a highest ranked second keyword in the second set of keywords; and
provide the second content item to the client device requesting the destination webpage.

10. The system of claim 9, wherein the server is further configured to:
determine that the second network activity of the second source webpage is greater than the network activity of the first source webpage; and
assign a greater weight to the second set of keywords responsive the determination that the second network activity of the second source webpage is greater than the network activity of the first source webpage.

11. A method of content selection, comprising:
providing a destination webpage to a first client device of a plurality of client devices responsive to a first request from the first client device, the first request identifying a first source webpage as a referrer, the first source webpage comprising a link to the destination webpage;
identifying a set of keywords on the first source webpage;
for each keyword of the set of keywords:
calculating a proximity of the keyword to the link to the destination webpage on the first source webpage,
identifying a network activity value based on the value of an interaction with the keyword on the first source webpage,
determining a ratio between a historical number of requests from the plurality of client devices for the destination webpage responsive to interactions with the link on the first source webpage, and a historical number of requests from the plurality of client devices for the destination webpage responsive to interactions with a third link on a third source webpage, and
calculating a score for the respective keyword, based on the calculated proximity, the network activity value, and the determined ratio;
ranking each keyword in the set of keywords based on the score for the respective keyword;
selecting a content item based on a highest ranked keyword in the set of keywords; and
providing the selected content item to a client device requesting the destination webpage.

12. The method of claim 11, wherein the first source web page comprises an anchor web page, and the second web page comprises a landing web page provided by a content provider device.

13. The method of claim 11, further comprising:
scraping the first source web page to identify the set of keywords, and store the set of keywords in a database.

14. The method of claim 11, further comprising:
rendering code of the first web page;
determining a distance between each of the set of keywords of the first source web page and a second content item comprising the link; and
calculating the score for each of the set of keywords further based on the distance between each keyword of the set of keywords of the first source web page and the second content item.

15. The method of claim 14, further comprising:
determining the distance between a first keyword of the set of keywords of the first source web page and the second content item based on a number of characters between the first keyword and the second content item; and
calculating the score for the first keyword based on the distance between the first keyword and the second content item.

16. The method of claim 14, further comprising:
determining the distance between the first keyword of the set of keywords of the first source web page and the second content item based on a number of pixels between the first keyword and the second content item; and
calculating the score for the first keyword further based on the distance between the first keyword and the second content item.

17. The method of claim 14, further comprising:
determining a bucketized distance between a first keyword of the plurality of keywords of the first web page and the content item, the bucketized distance corresponding to at least one of:
within a threshold number of words,
within a same sentence,
within a same paragraph, or
within a same fold of the first web page; and
calculating, by the data processing system, the score for the first keyword based on the bucketized distance between the first keyword and the second content item.

18. The method of claim 11, further comprising:
identifying a second network communication path traversed by a second plurality of client computing devices via the network protocol, the second network communication path including a third web page and the first source web page, the third web page comprising a link pointing to the first source web page; and
calculating, based on a second parameter of the second network communication path and a proximity of each of a third set of keywords to the link of the third web page that points to the first source web page via the network protocol, a third score for each of the third set of keywords.

19. The method of claim 11, further comprising:
providing the destination webpage to the first client device responsive to a second request from the first client device, the second request identifying a second source webpage as a referrer, the second source webpage comprising a second link to the destination webpage;
identifying a second set of keywords of the second source webpage;
for each second keyword of the second set of keywords:
calculating a second proximity of the second keyword to the second link to the destination webpage on the second source webpage,
identifying a second network activity value based on the value of a second interaction with the second keyword on the second source webpage,
determining a second ratio between a second historical number of requests from client devices for the destination webpage responsive to interactions with the second link on the second source webpage, and a second historical number of requests from client devices for the destination webpage responsive to interactions with a fourth link on a fourth source webpage, and
calculating a respective second score for the second keyword, based on the calculated second proximity, the second network activity value, and the second determined ratio;
ranking each second keyword in the second set of keywords based on the respective second score;
selecting a second content item based on a highest ranked second keyword in the second set of keywords; and
providing the second content item to the client device requesting the destination webpage.

20. The method of claim 19, further comprising:
determining that the second network activity of the second source webpage is greater than the network activity of the first source webpage; and
assigning a greater weight to the second set of keywords responsive the determination that the second network activity of the second source webpage is greater than the network activity of the first source webpage.

* * * * *